United States Patent
Murata

(10) Patent No.: US 11,906,471 B2
(45) Date of Patent: Feb. 20, 2024

(54) VIBRATION ANALYSIS DEVICE, VIBRATION ANALYSIS SYSTEM, AND VIBRATION ANALYSIS METHOD

(71) Applicant: KELK Ltd., Kanagawa (JP)

(72) Inventor: Tomonori Murata, Kanagawa (JP)

(73) Assignee: KELK Ltd., Kanagawa (JP)

( * ) Notice: Subject to any disclaimer, the term of this patent is extended or adjusted under 35 U.S.C. 154(b) by 54 days.

(21) Appl. No.: 17/572,888

(22) Filed: Jan. 11, 2022

(65) Prior Publication Data

US 2022/0221432 A1   Jul. 14, 2022

(30) Foreign Application Priority Data

Jan. 13, 2021   (JP) .................. 2021-003764

(51) Int. Cl.
*G01N 29/44*   (2006.01)
*G01N 29/14*   (2006.01)

(52) U.S. Cl.
CPC ........... *G01N 29/449* (2013.01); *G01N 29/14* (2013.01)

(58) Field of Classification Search
CPC ........................ G01N 29/449; G01N 29/14
See application file for complete search history.

(56) References Cited

U.S. PATENT DOCUMENTS

| | | | | |
|---|---|---|---|---|
| 2005/0279169 A1* | 12/2005 | Lander | ........... | G01N 29/14 73/592 |
| 2013/0167649 A1* | 7/2013 | Heda | ........... | G01H 1/006 73/660 |
| 2015/0198578 A1* | 7/2015 | Worden | ........... | G01F 23/263 73/53.05 |

FOREIGN PATENT DOCUMENTS

| | | | |
|---|---|---|---|
| JP | H07286892 A | * | 10/1995 |
| JP | 2009-020090 | | 1/2009 |
| JP | 2009211570 A | * | 9/2009 |

* cited by examiner

*Primary Examiner* — Natalie Huls
*Assistant Examiner* — Cynthia L Davis
(74) *Attorney, Agent, or Firm* — Fish & Richardson P.C.

(57) ABSTRACT

An analysis device includes a vibration sensor that detects vibration of a machine, a calculation unit that defines a peak value on the basis of a standard deviation of detection data of the vibration sensor, and a wireless communication device that transmits processed data output from calculation performed by the calculation unit.

6 Claims, 6 Drawing Sheets

VIBRATION ANALYSIS DEVICE, VIBRATION ANALYSIS SYSTEM, AND VIBRATION ANALYSIS METHOD

CROSS-REFERENCE TO RELATED APPLICATION(S)

The present application claims priority to and incorporates by reference the entire contents of Japanese Patent Application No. 2021-003764 filed in Japan on Jan. 13, 2021.

BACKGROUND OF THE INVENTION

1. Field of the Invention

The present disclosure relates to an analysis device, an analysis system, and an analysis method.

2. Description of the Related Art

For diagnosis of the presence/absence of abnormality in a machine, a technology is known to detect a vibration generated during the operation of the machine, with a vibration sensor (e.g., JP 2009-020090 A). For calculation that is effective in monitoring and analyzing vibration of the machine, a peak value, effective value (root mean square value (RMS)), and overall value of acceleration, and a crest factor (CF) obtained by dividing the peak value by the effective value are used. In order to obtain these values, a maximum value of an absolute value, root mean square, quadratic mean of waveform data of vibration acquired by an acceleration sensor are used, and calculation for dividing the maximum value of the absolute value by the root mean square is performed.

Incidentally, the effective value and the overall value are average values. Therefore even if there is a variation in repeated measurement, a calculation result has a small margin of error. Meanwhile, the peak value is one point on the acquired waveform. Therefore, when there is a variation in repeated measurement, the calculation result may have a large margin of error. For example, a method of reducing the variation by taking an average of several top points from a maximum peak value is conceivable, but when the maximum peak value is significantly larger than the other values, the variation is large, and there is still a possibility that the margin of error in the calculation result may be large. The crest factor that is particularly important to monitor the state of the machine depends on the peak value, and when the margin of error in the peak value is large, there is a problem that monitoring the state of the machine is adversely affected.

An object of the present disclosure is to output a stable calculation result.

SUMMARY OF THE INVENTION

It is an object of the present invention to at least partially solve the problems in the conventional technology.

According to an aspect of the present invention, an analysis device comprises: a vibration sensor that detects vibration of a machine; a calculation unit that performs calculation to define a peak value based on a standard deviation of detection data of the vibration sensor; and a wireless communication device that transmits processed data output from the calculation performed by the calculation unit.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Embodiments according to the present disclosure will be described below with reference to the drawings, but the present disclosure is not limited to the description. Component elements according to the embodiments described below may be appropriately combined with each other. Furthermore, some of the component elements are not used in some cases.

In the embodiments, an XYZ orthogonal coordinate system is set, and positional relationships between functional units will be described with reference to the XYZ orthogonal coordinate system. A direction parallel to an X-axis in a predetermined plane is represented as an X-axis direction, a direction parallel to a Y-axis orthogonal to the X-axis in the predetermined plane is represented as a Y-axis direction, and a direction parallel to a Z-axis orthogonal to the predetermined plane is represented as a Z-axis direction. An XY plane, including the X- and Y-axes, is parallel to the predetermined plane.

First Embodiment

Analysis Device

Figure 1:
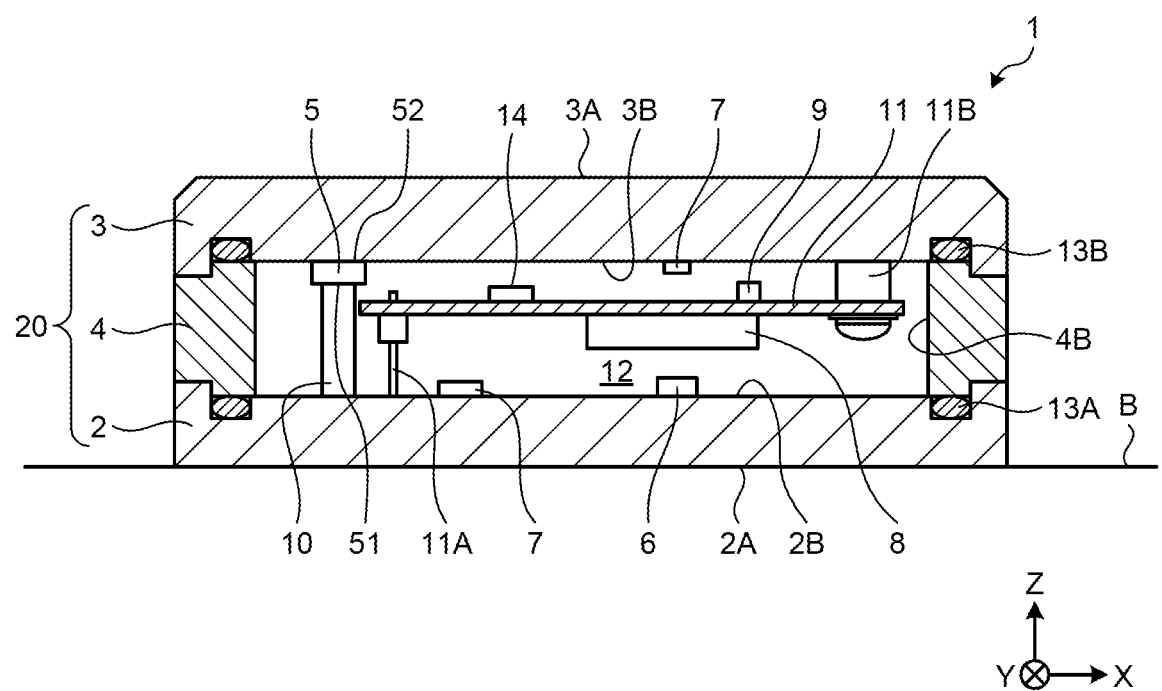
FIG. 1 is a cross-sectional view schematically illustrating an analysis device according to a first embodiment.

FIG. 1 is a cross-sectional view schematically illustrating an analysis device 1 according to the present embodiment. The analysis device 1 is installed on a machine B. The machine B is provided in an industrial facility such as a factory. An example of the machine B includes a rotary machine. An example of the rotary machine includes a motor that operates a pump.

As illustrated in FIG. 1, the analysis device 1 includes a heat reception portion 2, a heat release portion 3, a peripheral wall portion 4, a thermoelectric generation module 5, a vibration sensor 6, a microcomputer 8, a wireless communication device 9, a heat transfer member 10, a circuit board 11, and a power storage unit 14.

The heat reception portion 2 is installed on the machine B. The heat reception portion 2 is a plate-shaped member. The heat reception portion 2 is formed of a metal material such as aluminum or copper. The heat reception portion 2 receives heat from the machine B. The heat of the heat reception portion 2 is transferred to the thermoelectric generation module 5 via the heat transfer member 10.

The heat release portion 3 is opposed to the heat reception portion 2 with a space therebetween. The heat release portion 3 is a plate-shaped member. The heat release portion 3 is formed of a metal material such as aluminum or copper. The heat release portion 3 receives heat from the thermoelectric generation module 5. The heat of the heat release portion 3 is released into ambient air around the analysis device 1.

The heat reception portion 2 has a heat reception surface 2A that is opposed to a surface of the machine B and an inside surface 2B that faces in a direction opposite to the heat reception surface 2A. The heat reception surface 2A faces in a −Z direction. The inside surface 2B faces in a +Z direction. Each of the heat reception surface 2A and the inside surface 2B has a flat shape. Each of the heat reception surface 2A and the inside surface 2B is parallel to the XY plane. In the XY plane, the heat reception portion 2 has substantially a square outer shape. Note that the heat reception portion 2 may not have the square outer shape. The heat reception portion 2 may have a circular, elliptical, or any polygonal outer shape.

The heat release portion 3 has a heat release surface 3A that faces the ambient air and an inside surface 3B that faces in a direction opposite to the heat release surface 3A. The heat release surface 3A faces in the +Z direction. The inside surface 3B faces in the −Z direction. Each of the heat release surface 3A and the inside surface 3B has a flat shape. Each of the heat release surface 3A and the inside surface 3B is parallel to the XY plane. In the XY plane, the heat release portion 3 has substantially a square outer shape. Note that the heat release portion 3 may not have the square outer shape. The heat release portion 3 may have a circular, elliptical, or any polygonal outer shape.

In the XY plane, the heat reception portion 2 and the heat release portion 3 are substantially equal in outer shape and size. Note that the outer shape and size of the heat reception portion 2 and the outer shape and size of the heat release portion 3 may be different from each other.

The peripheral wall portion 4 is arranged between a peripheral edge portion of the inside surface 2B of the heat reception portion 2 and a peripheral edge portion of the inside surface 3B of the heat release portion 3. The peripheral wall portion 4 connects the heat reception portion 2 and the heat release portion 3. The peripheral wall portion 4 is formed of a synthetic resin.

In the XY plane, the peripheral wall portion 4 has an annular shape. In the XY plane, the peripheral wall portion 4 has substantially a square outer shape. The heat reception portion 2, the heat release portion 3, and the peripheral wall portion 4 define an inner space 12 of the analysis device 1. The peripheral wall portion 4 has an inside surface 4B that faces the inner space 12. The inside surface 2B of the heat reception portion 2 faces the inner space 12. The inside surface 3B of the heat release portion 3 faces the inner space 12. The outer space of the analysis device 1 is the ambient air around the analysis device 1.

The heat reception portion 2, the heat release portion 3, and the peripheral wall portion 4 function as a housing of the analysis device 1 that defines the inner space 12. In the following description, the heat reception portion 2, the heat release portion 3, and the peripheral wall portion 4 are collectively referred to as a housing 20 appropriately.

A sealing member 13A is arranged between the peripheral edge portion of the inside surface 2B of the heat reception portion 2 and an end surface on the −Z side of the peripheral wall portion 4. A sealing member 13B is arranged between the peripheral edge portion of the inside surface 3B of the heat release portion 3 and an end surface on the +Z side of the peripheral wall portion 4. Each of the sealing member 13A and the sealing member 13B includes, for example, an O-ring. The sealing member 13A is arranged in a recess provided in the peripheral edge portion of the inside surface 2B. The sealing member 13B is arranged in a recess provided in the peripheral edge portion of the inside surface 3B. The sealing member 13A and the sealing member 13B inhibit foreign matter in the outer space of the analysis device 1 from entering the inner space 12.

The thermoelectric generation module 5 uses a Seebeck effect to generate power. The machine B functions as a heat source for the thermoelectric generation module 5. The thermoelectric generation module 5 is arranged between the heat reception portion 2 and the heat release portion 3. An end surface 51 on the −Z side of the thermoelectric generation module 5 is heated, a temperature difference is generated between the end surface 51 on the −Z side and an end surface 52 on the +Z side of the thermoelectric generation module 5, and thereby the thermoelectric generation module 5 generates power.

The end surface 51 faces in the −Z direction. The end surface 52 faces in the +Z direction. Each of the end surface 51 and the end surface 52 has a flat shape. Each of the end surface 51 and the end surface 52 is parallel to the XY plane. In the XY plane, the thermoelectric generation module 5 has substantially a square outer shape.

The end surface 52 is opposed to the inside surface 3B of the heat release portion 3. The thermoelectric generation module 5 is fixed to the heat release portion 3. The heat release portion 3 and the thermoelectric generation module 5 are bonded to each other, for example, by adhesive.

Note that in the example illustrated in FIG. 1, the thermoelectric generation module 5 is in contact with the heat release portion 3 but may be in contact with the heat reception portion 2.

The vibration sensor 6 detects the vibration of the machine B. The vibration sensor 6 is driven by power generated by the thermoelectric generation module 5. The vibration sensor 6 is arranged in the inner space 12. In the present embodiment, the vibration sensor 6 is supported on the inside surface 2B of the heat reception portion 2.

An example of the vibration sensor 6 includes an acceleration sensor. Note that the vibration sensor 6 may be a speed sensor or a displacement sensor. In the present embodiment, the vibration sensor 6 is configured to detect the vibration of the machine B in three directions of the X-axis direction, Y-axis direction, and Z-axis direction.

The microcomputer 8 controls the analysis device 1. The microcomputer 8 is driven by power generated by the thermoelectric generation module 5. The microcomputer 8 is arranged in the inner space 12. In the present embodiment, the microcomputer 8 is supported on the circuit board 11.

The wireless communication device 9 communicates with a management computer 100 (see FIG. 3, etc.) being outside the analysis device 1. The wireless communication device 9 is driven by power generated by the thermoelectric generation module 5. The wireless communication device 9 is arranged in the inner space 12. In the present embodiment, the wireless communication device 9 is supported on the circuit board 11.

The heat transfer member 10 connects the heat reception portion 2 and the thermoelectric generation module 5. The heat transfer member 10 transfers the heat of the heat reception portion 2 to the thermoelectric generation module 5. The heat transfer member 10 is formed of a metal material such as aluminum or copper. The heat transfer member 10 is a rod-shaped member elongated in the Z-axis direction. The heat transfer member 10 is arranged in the inner space 12.

The circuit board 11 includes a control board. The circuit board 11 is arranged in the inner space 12. The circuit board 11 is connected to the heat reception portion 2 via a support member 11A. The circuit board 11 is connected to the heat release portion 3 via a support member 11B. The circuit board 11 is supported by the support member 11A and the support member 11B so as to be separated from each of the heat reception portion 2 and the heat release portion 3.

The power storage unit 14 stores power generated by the thermoelectric generation module 5. An example of the power storage unit 14 includes a capacitor or a secondary battery.

Thermoelectric Generation Module

Figure 2:
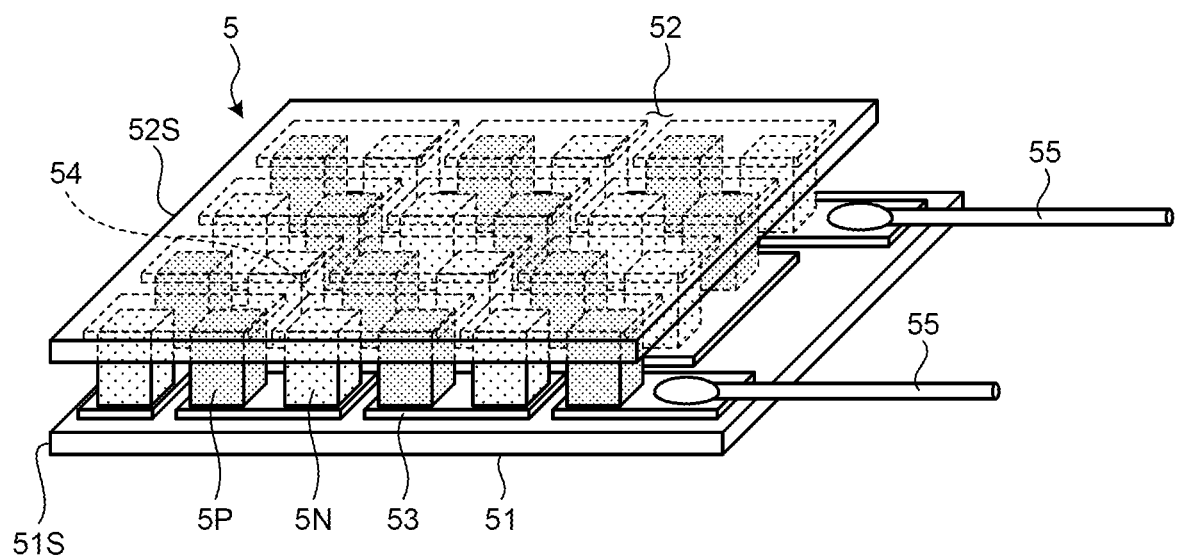
FIG. 2 is a perspective view schematically illustrating a thermoelectric generation module according to the first embodiment.

FIG. 2 is a perspective view schematically illustrating the thermoelectric generation module 5 according to the present embodiment. As illustrated in FIG. 2, the thermoelectric generation module 5 includes p-type thermoelectric semiconductor devices 5P, n-type thermoelectric semiconductor devices 5N, first electrodes 53, second electrodes 54, a first substrate 51S, and a second substrate 52S. In the XY plane, the p-type thermoelectric semiconductor devices 5P and the n-type thermoelectric semiconductor devices 5N are arranged alternately. Each of the first electrodes 53 is connected to each of the p-type thermoelectric semiconductor devices 5P and n-type thermoelectric semiconductor devices 5N. Each of the second electrodes 54 is connected to each of the p-type thermoelectric semiconductor devices 5P and the n-type thermoelectric semiconductor devices 5N. A lower surface of each p-type thermoelectric semiconductor device 5P and a lower surface of each n-type thermoelectric semiconductor device 5N are connected to each first electrode 53. An upper surface of each p-type thermoelectric semiconductor device 5P and an upper surface of each n-type thermoelectric semiconductor device 5N are connected to each second electrode 54. The first electrode 53 is connected to the first substrate 51S. The second electrode 54 is connected to the second substrate 52S.

Each of the p-type thermoelectric semiconductor device 5P and the n-type thermoelectric semiconductor device 5N includes, for example, a BiTe-based thermoelectric material. Each of the first substrate 51S and the second substrate 52S is formed of an electrical insulating material such as ceramics or polyimide.

The first substrate 51S has the end surface 51. The second substrate 52S has the end surface 52. In response to heating the first substrate 51S, a temperature difference is generated between end portions on the +Z side and −Z side of each p-type thermoelectric semiconductor device 5P and n-type thermoelectric semiconductor device 5N. In response to generation of the temperature difference between the end portions on the +Z side and −Z side of the p-type thermoelectric semiconductor device 5P, holes move in the p-type thermoelectric semiconductor device 5P. In response to generation of the temperature difference between the end portions on the +Z side and −Z side of the n-type thermoelectric semiconductor device 5N, electrons move in the n-type thermoelectric semiconductor device 5N. The p-type thermoelectric semiconductor device 5P and the n-type thermoelectric semiconductor device 5N are connected via the first electrode 53 and the second electrode 54. A potential difference is generated between the first electrode 53 and the second electrode 54 due to the holes and the electrons. The thermoelectric generation module 5 generates power due to the potential difference between the first electrode 53 and the second electrode 54. A lead wire 55 is connected to the first electrode 53. The thermoelectric generation module 5 outputs power via the lead wire 55.

Microcomputer

Figure 3:
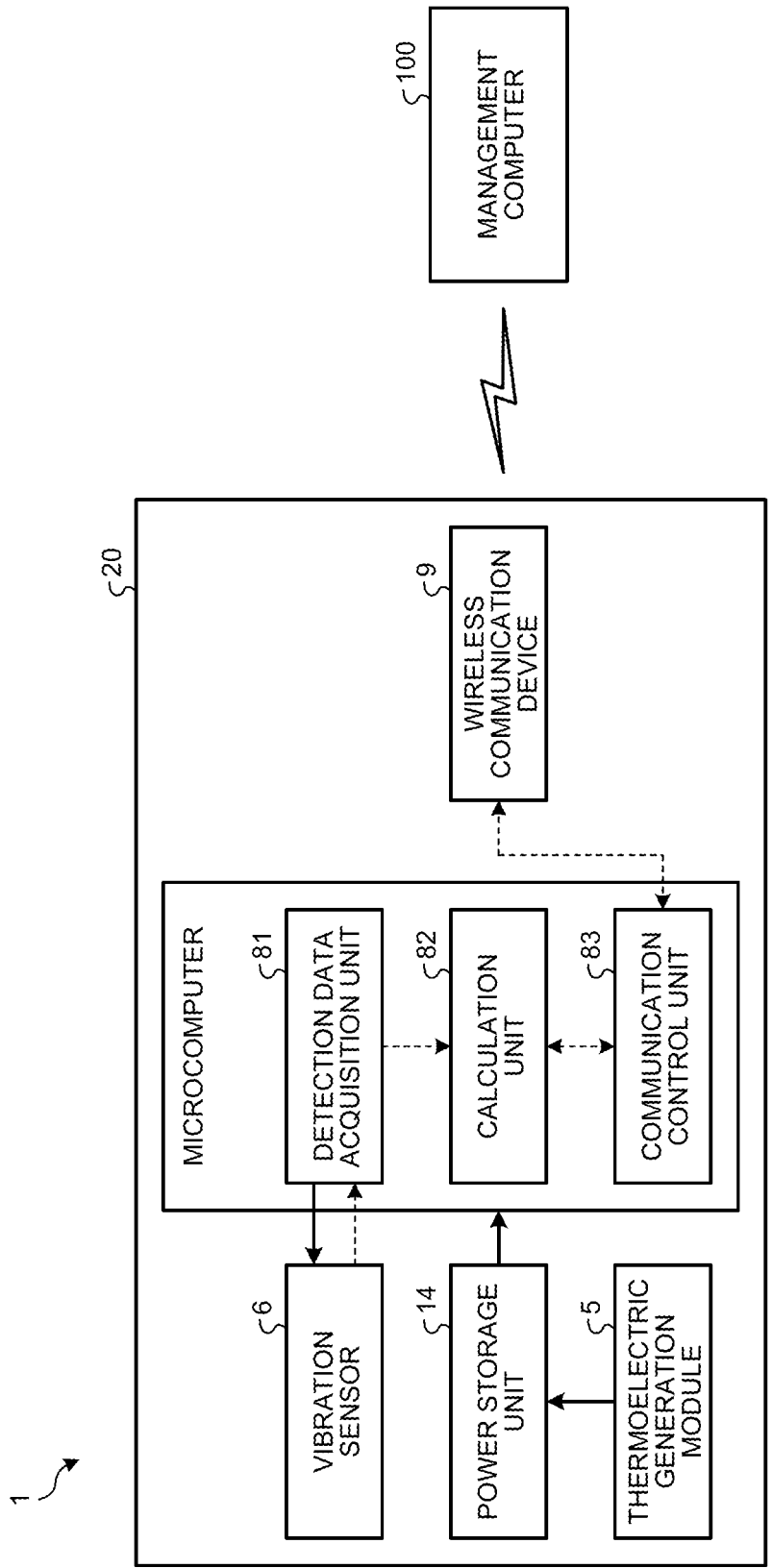
FIG. 3 is a block diagram illustrating the analysis device according to the first embodiment.

FIG. 3 is a block diagram illustrating the analysis device 1 according to the present embodiment. As illustrated in FIG. 3, the thermoelectric generation module 5, the power storage unit 14, the vibration sensor 6, the microcomputer 8, and the wireless communication device 9 are housed in one housing 20.

The microcomputer 8 includes a detection data acquisition unit 81, a calculation unit 82, and a communication control unit 83.

The detection data acquisition unit 81 acquires detection data of the vibration sensor 6 in a preset measurement time and at a preset sampling frequency (output data rate: ODR). The detection data of the vibration sensor 6 includes a vibration waveform. The measurement time and the sampling frequency need to be set within a range satisfying a condition such as that the sampling points do not exceed an upper limit value that depends on a memory capacity of the microcomputer 8.

The calculation unit 82 causes each unit of the microcomputer 8 to execute a program stored in advance. The calculation unit 82 performs calculation processing on the basis of the detection data of the vibration sensor 6 acquired by the detection data acquisition unit 81, outputting the processed data. The processed data refers to data generated by performing data processing on the detection data.

The calculation unit 82 is configured to process the detection data of the vibration sensor 6 on the basis of a vibration analysis method such as fast Fourier transform (FFT) and output the processed data. Before performing the FFT analysis, the calculation unit 82 may perform processing using high pass filter (HPF) and a low pass filter (LPF) as a band pass filter (BPF).

The processed data generated by the calculation unit 82 includes, for example, at least one of a peak value, effective value, frequency, overall value, and crest factor of the vibration of the machine B that are calculated on the basis of the detection data of the vibration sensor 6.

The calculation unit 82 is configured to process the detection data of the vibration sensor 6 to calculate the peak value of the vibration of the machine B. The peak value of the vibration includes a maximum value and a minimum value of the vibration. The peak value of the vibration may be a peak value in the entire range of the vibration waveform or may be a peak value in each of a plurality of frequency ranges of the vibration waveform. The peak value of the vibration may be a peak value of acceleration, a peak value of velocity, or a peak value of displacement.

The calculation unit 82 calculates a standard deviation $\sigma$ of the vibration waveform (e.g., acceleration data) acquired by the detection data acquisition unit 81. The calculation unit 82 extracts accelerations at respective time points at which the accelerations have absolute values larger than a value $n\sigma$ obtained by multiplying the standard deviation $\sigma$ by a coefficient n, and calculates an average value of the absolute values of the extracted accelerations. The calculation unit 82 defines, as a peak value of the vibration, the average value of accelerations having absolute values larger than the calculated value $n\sigma$. The coefficient n is set in advance. The coefficient n is set within a range of 2≤n≤3. The coefficient n is changeable as appropriate. The coefficient n may be set by an operator, for example, from the management computer 100 via wireless communication.

The calculation unit 82 is configured to process the detection data of the vibration sensor 6 to calculate the effective value (root mean square value: RMS) of the vibration of the machine B. Furthermore, the calculation unit 82 may divide the entire range of the vibration waveform detected by the vibration sensor 6 into a plurality of frequency ranges to calculate the effective value for each of the plurality of frequency ranges. The effective value of vibration may be an effective value of acceleration, an effective value of velocity, or an effective value of displacement.

The calculation unit 82 is configured to process the detection data of the vibration sensor 6 to calculate the frequency of the vibration of the machine B. Furthermore, the calculation unit 82 is configured to process the detection data of the vibration sensor 6 to calculate the overall value of the vibration.

The calculation unit 82 is configured to calculate the crest factor (CF) of the machine B, on the basis of the defined peak value and the calculated effective value. The crest factor refers to a ratio (peak value/effective value) of the peak value to the effective value. For example, in a case where a state of a bearing of the motor of the rotary machine is diagnosed, large crest factor indicates a tendency that the bearing is damaged and impact vibration occurs, and small crest factor indicates a tendency that a load of the motor increases due to poor lubrication of the bearing.

The communication control unit 83 causes the wireless communication device 9 to communicate with the management computer 100. When the wireless communication device 9 receives setting data for setting the coefficient n defining the peak value, from the management computer 100, the communication control unit 83 outputs the received setting data to the calculation unit 82.

Furthermore, the communication control unit 83 controls the wireless communication device 9 so as to transmit the detection data of the vibration sensor 6 acquired by the detection data acquisition unit 81 to the management computer 100. The wireless communication device 9 transmits the detection data of the vibration sensor 6 acquired by the detection data acquisition unit 81 to the management computer 100.

Furthermore, when the processed data is output by the calculation unit 82, the communication control unit 83 controls the wireless communication device 9 so as to transmit the processed data to the management computer 100. The wireless communication device 9 transmits the processed data calculated by the calculation unit 82 to the management computer 100.

Analysis Method

Figure 4:
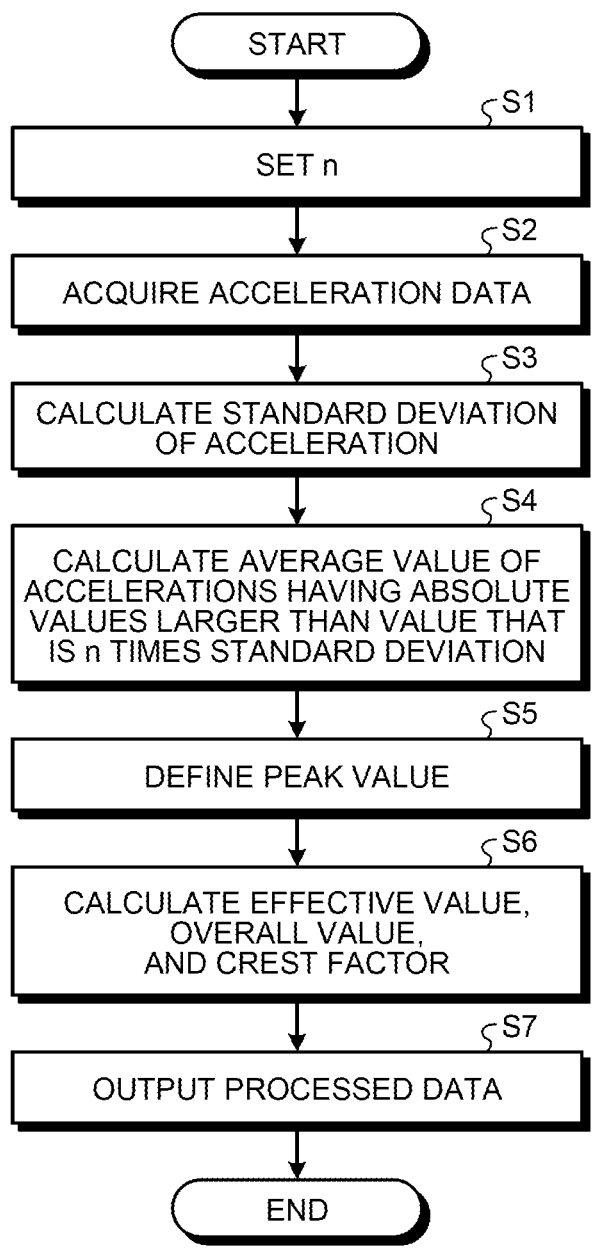
FIG. 4 is a flowchart illustrating an analysis method according to the first embodiment.

FIG. 4 is a flowchart illustrating an analysis method according to the present embodiment. The machine B on which the analysis device 1 is installed is the motor that is a kind of the rotary machine. The motor operates the pump. In the analysis method of the present embodiment, the peak value, effective value, overall value, and crest factor of the vibration are output as the processed data to diagnose the presence/absence of scratches on the bearing of the motor.

In the analysis device 1, the calculation unit 82 sets the coefficient n for defining the peak value, on the basis of, for example, the setting data set from the management computer 100 via wireless communication (Step S1).

The detection data acquisition unit 81 acquires raw data about the vibration waveform, as the detection data, from the vibration sensor 6. The raw data about the vibration waveform is the acceleration data based on the measurement time and the sampling points sampled with the sampling frequency (ODR), which are set by the calculation unit 82 (Step S2).

Figure 5:
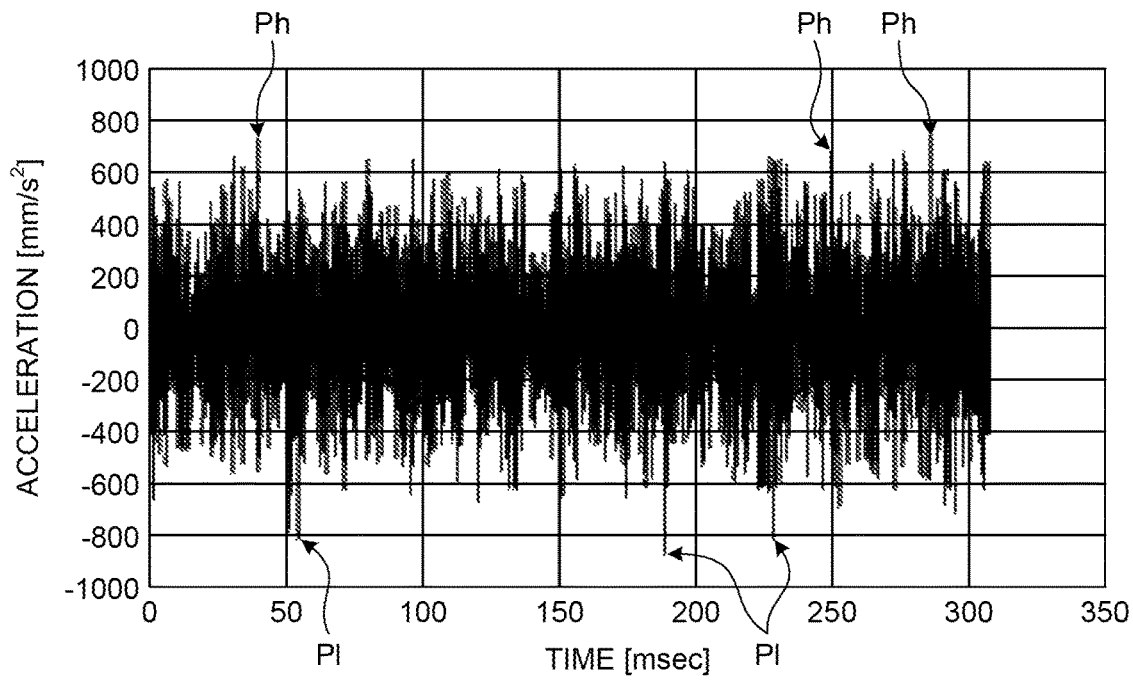
FIG. 5 is a graph illustrating an example of detection data in the analysis method according to the first embodiment.

FIG. 5 is a graph illustrating an example of detection data in the analysis method according to the present embodiment. In FIG. 5, the vertical axis represents acceleration [m/s$^2$] detected by the vibration sensor 6, and the horizontal axis represents time [msec].

In Step S2 illustrated in FIG. 4, the detection data acquisition unit 81 acquires waveform data of the acceleration as illustrated in FIG. 5. As illustrated in FIG. 5, in the acquired waveform data of the acceleration, the peaks vary in magnitude (maximum values Ph and minimum values Pl). In other words, when the acquired waveform data of the acceleration is processed directly, a calculation result may have a large margin of error.

The calculation unit 82 calculates the standard deviation σ of the acceleration data acquired by the detection data acquisition unit 81 in Step S2 (Step S3).

Figure 6:
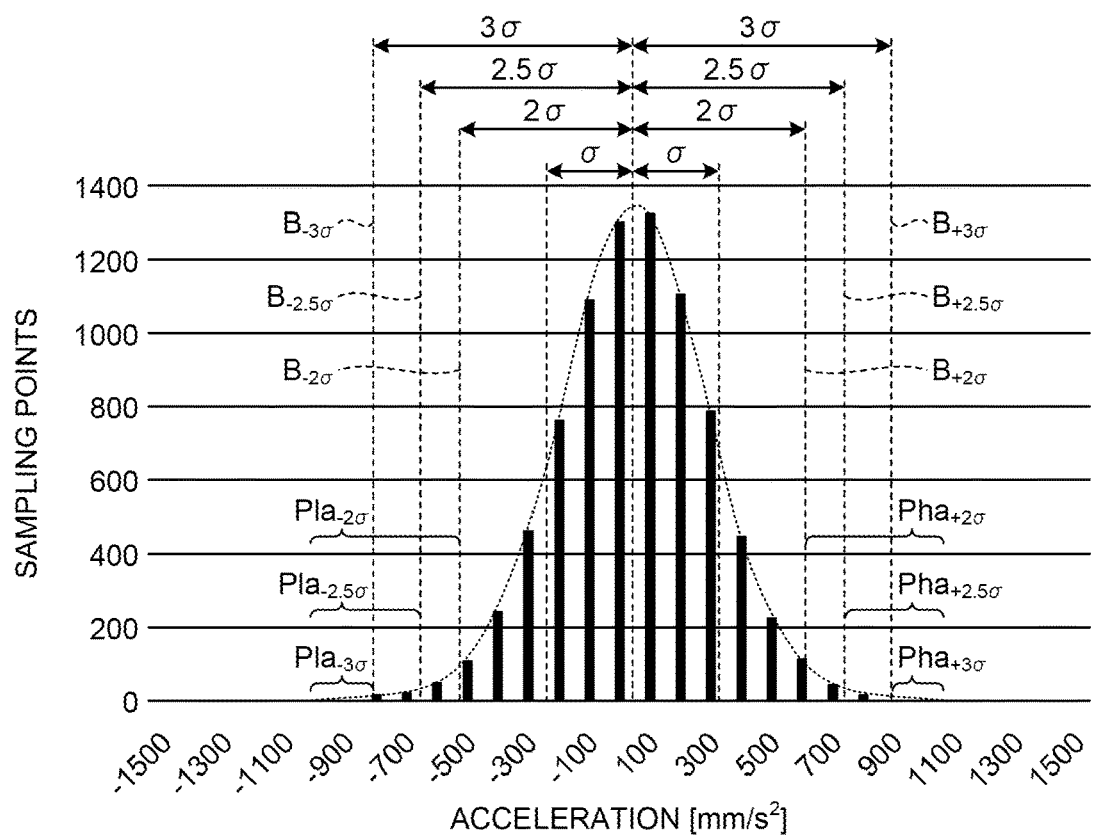
FIG. 6 is a diagram illustrating a histogram of FIG. 5.
Figure 7:
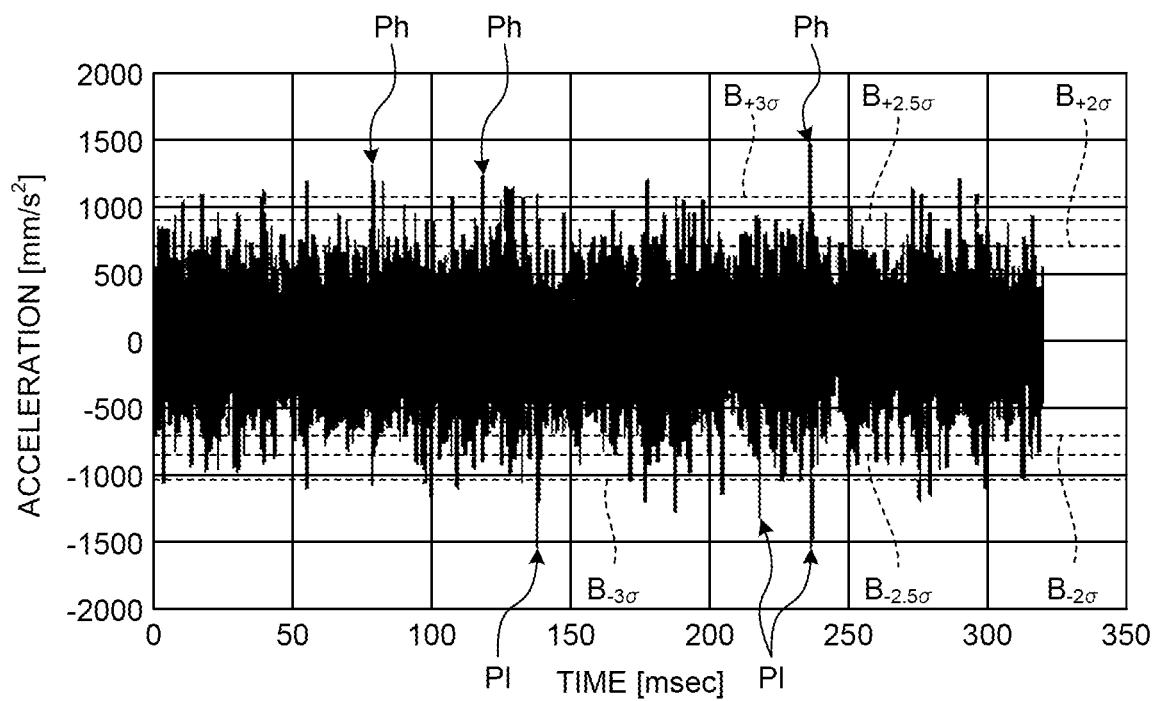
FIG. 7 is a graph illustrating a method of defining a peak value in the analysis method according to the first embodiment.

FIG. 6 is a diagram illustrating a histogram of FIG. 5. In FIG. 6, the vertical axis represents the sampling points, and the horizontal axis represents acceleration [m/s$^2$]. FIG. 7 is a graph illustrating a method of defining the peak value in the analysis method according to the present embodiment. In FIG. 7, the vertical axis represents acceleration [m/s$^2$] detected by the vibration sensor 6, and the horizontal axis represents time [msec].

As illustrated in FIG. 6, when the calculation unit 82 divides the acceleration data into a plurality of acceleration ranges and generates the histogram indicating the sampling points for each acceleration range, the histogram of the acceleration has a substantially normal distribution. Note that in the example illustrated in FIG. 6, one acceleration range is approximately 100 [m/s$^2$].

The calculation unit 82 extracts accelerations having absolute values larger than the value nσ that is n times the standard deviation σ calculated in Step S3, and calculates the average value of the extracted accelerations (Step S4). The calculation unit 82 calculates the average value of the absolute values of all extracted accelerations. The calculation unit 82 defines the average value of accelerations having absolute values larger than the calculated value nσ, as the peak value of the vibration (Step S5).

For example, when n=2, the calculation unit 82 calculates the average value of the absolute values of the accelerations included in a portion $Pha_{+2\sigma}$ outside a line $B_{+2\sigma}$ of the normal distribution illustrated in FIG. 6 and accelerations included in a portion $Pla_{-2\sigma}$ outside a line $B_{-2\sigma}$. Therefore, in the waveform data of the acceleration illustrated in FIG. 7, the calculation unit 82 defines, as the peak value of the vibration, the average value of the absolute values of the accelerations of points at which the values of the accelerations are $B_{+2\sigma}$ or more and accelerations of points at which the values of the accelerations are $B_{-2\sigma}$ or less.

For example, when n=2.5, the calculation unit 82 calculates the average value of the absolute values of the accelerations included in a portion $Pha_{+2.5\sigma}$ outside a line $B_{+2.5\sigma}$ of the normal distribution illustrated in FIG. 6 and accelerations included in a portion $Pla_{-2.5\sigma}$ outside a line $B_{-2.5\sigma}$. Therefore, in the waveform data of the acceleration illustrated in FIG. 7, the calculation unit 82 defines, as the peak value of the vibration, the average value of the absolute values of the accelerations of points at which the values of the accelerations are $B_{+2.5\sigma}$ or more and accelerations of points at which the values of the accelerations are $B_{-2.5\sigma}$ or less.

For example, when n=3, the calculation unit 82 calculates the average value of the absolute values of the accelerations included in a portion $Pha_{+3\sigma}$ outside a line $B_{+3\sigma}$ of the normal distribution illustrated in FIG. 6 and accelerations included in a portion $Pla_{-3\sigma}$ outside a line $B_{-3\sigma}$. Therefore, in the waveform data of the acceleration illustrated in FIG. 7, the calculation unit 82 defines, as the peak value of the vibration, the average value of the absolute values of the accelerations of points at which the values of the accelerations are $B_{+3\sigma}$ or more and accelerations of points at which the values of the accelerations are $B_{-3\sigma}$ or less.

The calculation unit 82 processes the detection data of the vibration sensor 6 to calculate the effective value. The calculation unit 82 processes the detection data of the vibration sensor 6 to calculate the overall value. The calculation unit 82 calculates the crest factor, on the basis of the peak value defined in Step S5 and the calculated effective value (Step S6).

The calculation unit 82 causes the wireless communication device 9 to transmit the calculated peak value, effective value, overall value, and crest factor, as the processed data. The wireless communication device 9 transmits the processed data to the management computer 100 (Step S7).

The management computer 100 is configured to monitor and manage the state of the machine B, on the basis of the transmitted processed data. The management computer 100 is configured to diagnose the presence/absence of abnormality in the machine B, on the basis of the transmitted processed data.

Effects

As described above, according to the present embodiments, the vibration sensor 6 is installed on the machine B. The detection data of the vibration sensor 6 is output to the microcomputer 8. The calculation unit 82 of the microcomputer 8 defines the peak value on the basis of the standard deviation $\sigma$ of the detection data of the vibration sensor 6.

As described above, defining the peak value from the average value of the range quantitatively extracted by the analysis method of the embodiment makes it possible to quantitatively calculate the peak value and reduce the margin of error of the calculation result. Therefore, even if a reduction in measurement points of the vibration waveform of the detection data or a reduction in measurement time due to the limitation of power or due to the capability of the microcomputer 8 causes a variation in the repeated measurement, a stable calculation result can be output, and the accuracy in monitoring the state of the machine B can be improved.

In the embodiment, the processed data output from the calculation performed by the calculation unit 82 is transmitted from the wireless communication device 9 to the management computer 100. Therefore, the management computer 100 is configured to appropriately diagnose the machine B, on the basis of the peak value quantitatively calculated and each value calculated from the peak value.

In the embodiment, the calculation unit 82 defines, as the peak value, the average value of accelerations having the absolute values larger than the value $n\sigma$ obtained by multiplying the standard deviation $\sigma$ by the coefficient n, for the detection data of the vibration sensor 6. The calculation unit 82 is configured to change the coefficient n. In other words, the peak value can be defined on the basis of the value that is coefficient n times the standard deviation $\sigma$, and thus, a definition range of the peak is readily changeable according to a diagnosis target or the like.

Second Embodiment

A second embodiment will be described. In the following description, component elements that are the same as or equivalent to those in the above first embodiment are denoted by the same reference numerals and symbols, and description thereof will be simplified or omitted.

Analysis System

Figure 8:
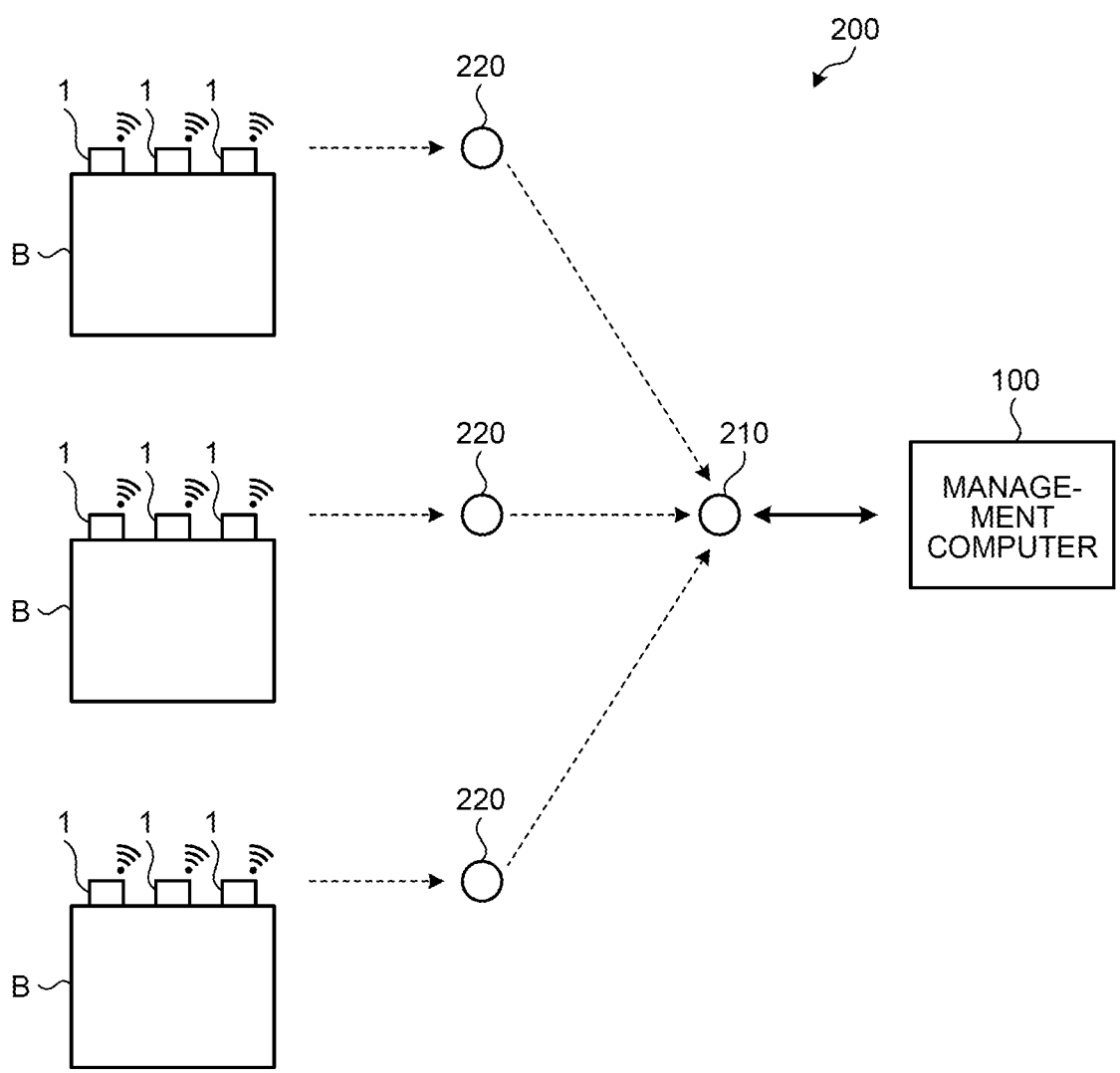
FIG. 8 is a diagram schematically illustrating an analysis system according to a second embodiment.

FIG. 8 is a diagram schematically illustrating an analysis system 200 according to the present embodiment. As illustrated in FIG. 8, the analysis system 200 includes a plurality of analysis devices 1 installed on a machine B, a communication device 210, and a repeater 220. A plurality of the machines B is provided in the industrial facility. As described above, the example of the machine B includes the motor that operates the pump. The machine B may be installed in the basement. When the machine B operates, the machine B generates heat. The machine B functions as a heat source for the analysis devices 1.

The communication device 210 receives detection data of the vibration sensor 6 transmitted from each of the plurality of analysis devices 1 and processed data output by the calculation unit 82, via the repeater 220, and transmits the data to the management computer 100. The communication device 210 processes, for example, the detection data and the processed data transmitted from each of the plurality of analysis devices 1 into a predetermined format, and then transmits the data to the management computer 100. The detection data and the processed data from the plurality of analysis devices 1 are aggregated by the communication device 210 and then transmitted to the management computer 100. The communication device 210 and the management computer 100 may communicate with each other in a wireless manner or a wired manner.

The repeater 220 connects between the analysis device 1 and the communication device 210. A plurality of the repeaters 220 is provided. Each of the repeaters 220 communicates with the communication device 210 in a wireless manner.

The management computer 100 is configured to monitor and manage the state of each of the plurality of machines B, on the basis of the detection data of the vibration sensor 6 transmitted from each of the plurality of analysis devices 1 and the processed data output by each calculation unit 82. The management computer 100 is configured to diagnose the presence/absence of abnormality of each machine B, on the basis of the detection data of the vibration sensor 6 transmitted from each of the plurality of analysis devices 1 and the processed data output by each calculation unit 82.

The plurality of analysis devices 1 is configured to transmit the detection data and the processed data independently. In other words, the analysis device 1 is configured to transmit the detection data and the processed data without being affected by another analysis device 1.

For example, in a case where the machines B and the analysis devices 1 are located in the basement and the communication device 210 and the management computer 100 are located on the ground, the detection data and the processed data that are transmitted from the analysis devices 1 are smoothly transmitted to the management computer 100 due to providing the repeaters 220.

Effects

As described above, in the present embodiment, the analysis system 200 includes the plurality of analysis devices 1 installed on the plurality of machines B, and the communication device 210 that receives the processed data transmitted from each of the plurality of analysis devices 1 and transmits the processed data to the management computer 100. Therefore, the management computer 100 is allowed to monitor and manage the state of the plurality of machines B and diagnose the presence/absence of abnormality in the plurality of machines B.

Other Embodiments

Note that in the embodiments described above, the management computer 100 may include one computer or a plurality of computers.

In the embodiments described above, one housing 20 houses the thermoelectric generation module 5, the vibration sensor 6, the microcomputer 8, and the wireless communication device 9. The thermoelectric generation module 5 may be housed in a first housing, and the vibration sensor 6, the microcomputer 8, and the wireless communication device 9 may be housed in a second housing. The first housing and the second housing are separate housings. The power storage unit 14 may be arranged between the first housing and the second housing.

In the embodiments described above, the function of the calculation unit 82 may be provided in the management computer 100. The detection data of the vibration sensor 6 may be transmitted to the management computer 100 via the wireless communication device 9 so that the management computer 100 may output the processed data. Furthermore, a function of the management computer 100 may be provided in the microcomputer 8. For example, the calculation unit 82 may diagnose the presence/absence of the abnormality.

According to the present disclosure, it is possible to output a stable calculation result in vibration phenomenon following a normal distribution.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An analysis device comprising:
    a vibration sensor configured to detect vibration of a machine in a x-axis direction, a y-axis direction, and a z-axis direction;
    a calculation unit, implemented using one or more computing devices, configured to determine a peak value based on a standard deviation of data including the detected vibration; and
    a transceiver configured to transmit, to a management computer, processed data including the determined peak value to thereby cause the management computer to detect an abnormality in the machine based on the processed data including the determined peak value,
    wherein the calculation unit is configured to determine, as the peak value, an average value of accelerations having absolute values greater than a value obtained by multiplying the standard deviation by a coefficient, with respect to the data including the detected vibration.

2. The analysis device according to claim 1, wherein the calculation unit is configured to change the coefficient.

3. The analysis device according to claim 1, further comprising a thermoelectric generator including a thermoelectric semiconductor,
    wherein the vibration sensor is driven by power generated by the thermoelectric generator.

4. The analysis device according to claim 1, wherein the processed data includes at least one of the peak value, an effective value, a frequency, an overall value, and a crest factor of the vibration of the machine based on the data including the detected vibration.

5. An analysis method comprising:
    acquiring, from a vibration sensor, data including detected vibration of a machine in a x-axis direction, a y-axis direction, and a z-axis direction;
    determining a peak value, based on a standard deviation of the data including the detected vibration; and
    transmitting, to a management computer, processed data including the determined peak value to thereby cause the management computer to detect an abnormality in the machine based on the processed data including the peak value,
    wherein determining the peak value comprises:
        determining, as the peak value, an average value of accelerations having absolute values greater than a value obtained by multiplying the standard deviation by a coefficient, with respect to the data including the detected vibration.

6. The analysis method according to claim 5, further comprising:
    driving the vibration sensor by power generated by a thermoelectric generator including a thermoelectric semiconductor.

* * * * *